(12) United States Patent
Li et al.

(10) Patent No.: US 8,832,519 B2
(45) Date of Patent: Sep. 9, 2014

(54) METHOD AND APPARATUS FOR FEC ENCODING AND DECODING

(75) Inventors: Jun Li, Cranbury, NJ (US); Xiao Jun Ma, Beijing (CN); Huan Qiang Zhang, Beijing (CN); Charles Chuanming Wang, Philadelphia, PA (US)

(73) Assignee: Thomson Licensing, Issy les Moulineaux (FR)

( * ) Notice: Subject to any disclaimer, the term of this patent is extended or adjusted under 35 U.S.C. 154(b) by 76 days.

(21) Appl. No.: 12/734,536

(22) PCT Filed: Nov. 4, 2008

(86) PCT No.: PCT/EP2008/064902
§ 371 (c)(1),
(2), (4) Date: May 7, 2010

(87) PCT Pub. No.: WO2009/059955
PCT Pub. Date: May 14, 2009

(65) Prior Publication Data
US 2011/0099449 A1    Apr. 28, 2011

(30) Foreign Application Priority Data
Nov. 7, 2007  (EP) ................................. 07301530

(51) Int. Cl.
*H03M 13/00* (2006.01)
*H04L 12/801* (2013.01)
*H04L 1/00* (2006.01)
*H04L 29/06* (2006.01)
*H04L 29/14* (2006.01)

(52) U.S. Cl.
CPC ............ *H04L 1/0041* (2013.01); *H04L 47/10* (2013.01); *H04L 65/605* (2013.01); *H04L 2001/0098* (2013.01); *H04L 69/40* (2013.01)

USPC ........................................... 714/752; 370/473

(58) Field of Classification Search
USPC .................................. 714/752, 786; 370/473
See application file for complete search history.

(56) References Cited

U.S. PATENT DOCUMENTS

| | | | |
|---|---|---|---|
| 7,095,782 B1 * | 8/2006 | Cohen et al. | 375/240.01 |
| 2003/0067872 A1 * | 4/2003 | Harrell et al. | 370/229 |

(Continued)

FOREIGN PATENT DOCUMENTS

| | | |
|---|---|---|
| JP | 2005277701 | 10/2005 |
| JP | 2006229463 | 8/2006 |

(Continued)

OTHER PUBLICATIONS

Zhi-Jin Wang et al "Receiver-Buffer-Driven Layered Quality Adaptation for Multimedia Streaming" Signals, Systems and Computers, 2005, Conference Record of the Thirty-Ninth Asilomar Conference on Pacific Grove, CA, Oct. 28-Nov. 1, 2005 IEEE. pp. 1235-1239.

(Continued)

*Primary Examiner* — Yolanda L Wilson
(74) *Attorney, Agent, or Firm* — Tutunjian & Bitetto P.C.

(57) ABSTRACT

A method for Forward Error Correction (FEC) encoding in a transmitter, the method comprising: receiving a data stream from a data source; generating a first Forward Error Correction data for respective data block with a first block size of the data stream; and generating a second Forward Error Correction data for respective data block with a second block size of the data stream, wherein the second block size is different with the first block size and wherein the data blocks of the first block size form the data stream, and the data blocks with the second block size form the data stream.

12 Claims, 6 Drawing Sheets

(56) References Cited

U.S. PATENT DOCUMENTS

| | | | |
|---|---|---|---|
| 2003/0076858 A1* | 4/2003 | Deshpande | 370/468 |
| 2004/0034712 A1* | 2/2004 | Rajwan et al. | 709/231 |
| 2005/0175028 A1* | 8/2005 | Feiten | 370/465 |
| 2005/0210356 A1* | 9/2005 | Chou et al. | 714/752 |
| 2005/0213668 A1 | 9/2005 | Iwabuchi et al. | |
| 2006/0164987 A1 | 7/2006 | Kuiz Floriach et al. | |
| 2007/0033494 A1* | 2/2007 | Wenger et al. | 714/776 |
| 2007/0126612 A1* | 6/2007 | Miller | 341/67 |
| 2007/0300134 A1 | 12/2007 | Sugai et al. | |
| 2008/0028275 A1* | 1/2008 | Chen et al. | 714/752 |
| 2008/0123781 A1* | 5/2008 | Pisek et al. | 375/340 |
| 2011/0099449 A1* | 4/2011 | Li et al. | 714/752 |

FOREIGN PATENT DOCUMENTS

| | | |
|---|---|---|
| JP | 2006352783 | 12/2006 |
| JP | 2007281868 | 10/2007 |
| WO | WO 01/65848 | 9/2001 |
| WO | WO2006031925 | 3/2006 |
| WO | WO2006061902 | 6/2006 |

OTHER PUBLICATIONS

Search Report Dated Feb. 11, 2009.

* cited by examiner

METHOD AND APPARATUS FOR FEC ENCODING AND DECODING

This application claims the benefit, under 35 U.S.C. §365 of International Application PCT/EP2008/064902, filed Nov. 4, 2008, which was published in accordance with the PCT Article 21(2) on May 14, 2009 in English and which claims the benefit of European patent application No. 07301530.7, filed Nov. 7, 2007.

FIELD OF THE INVENTION

The present invention relates to a encoding and decoding system, and more particularly, to a method and apparatus for FEC encoding and decoding in the system.

BACKGROUND OF THE INVENTION

In an analog video communication, such as in the analog broadcasting communication, video information in a new channel can be seen immediately when the current channel is changed into the new channel. However, in a digital video communication, video contents are usually transmitted in a coded way so as to save the network bandwidth. In such scheme the video contents at the source side are encoded into a series of packets before being transmitted over the network; at the destination side, the receiver receives and decodes the video packets for playing out. In addition, in order to protect packet losses, channel coding scheme such as Forward Error Correction (FEC) is usually used. Both video source coding and channel coding require a block of data to be processed at a time, therefore, a delay corresponding to at least one block of data is required when a channel change is requested. Thus, there is a period of time during which video blanking occurs until the information from the new channel occurs. This invention addresses the delay caused by channel coding especially FEC and proposes solution to reduce the delay and therefore the blanking time period at a channel change.

A good FEC encoding needs a large block size of the video information, and the FEC efficiency depends on the block size of FEC encoding. A bigger block size can have better error correction performance with less redundancy. However, big block size means more initial delay for the video stream of the new channel because a delay corresponding to at least one block size of video is required to get the first frame of video. If the TV programs' initial delay at the startup and/or the channel change will be too long, and will make the audiences feel uncomfortable. Usually, the customer can tolerate only 2-3 seconds channel change time. While an efficient channel coding may require 10 seconds even more initial delay (buffering).

A method and a video signal processor in the prior art is provided to reduce blanking time between changing from one program channel to another program channel. In the method, the video information of the current channel is buffered at a memory, and replaces the video blanking by continuing to broadcast the buffered video information during the channel changing. However, this method does not reduce the channel changing time actually. In addition, since the video information from the old channel can be seen after the command of changing channel has been transmitted, the user will be confused and does not know whether the command has effected.

Another method in the prior art is provided to eliminate the video blanking during the channel changing. In the method, various information such as text information, advertising or electronic service guide information is provided to replace the video blanking. However, similar to the above method, this method still does not reduce the channel changing time, and the user may think those information are unnecessary.

Therefore, it is needed to provide a method to overcome the above disadvantage in the prior art, so as to not only reduce the program startup and/or channel change time but also assure the channel changing efficiency.

SUMMARY OF THE INVENTION

The invention concerns a method and apparatus for Forward Error Correction (FEC) encoding and decoding at multiple levels.

The invention also concerns a method for Forward Error Correction (FEC) encoding in a transmitter, the method comprising: receiving a data stream from a data source; configuring the data stream to multiple levels of data blocks, wherein the data blocks of each level have a block size different with that of other levels, and cover the data stream; and generating FEC data for each data block of the multiple levels of the data stream.

The invention also concerns a method for Forward Error Correction (FEC) encoding in a transmitter, the method comprising: receiving data stream from a data source; generating a first Forward Error Correction data for respective data block with a first size of the data stream; and generating a second Forward Error Correction data for respective data block with a second size of the data stream, wherein the second size is different with the first size and wherein the data blocks of the first size form the data stream, and the data blocks with the second size form the data stream.

The invention also concerns a method for Forward Error Correction FEC decoding in a receiver, the method comprising: receiving FEC data along with data stream from a transmitter, wherein the FEC data are generated from respective data block with a first and a second block size of the data stream, and the second block size is different with the first block size; and decoding the data stream by FEC data for each block of the data stream.

The invention also concerns a transmitter for implementing the above mentioned FEC encoding method.

The invention also concerns a receiver for implementing the above mentioned FEC decoding method.

BRIEF DESCRIPTION OF DRAWINGS

These and other aspects, features and advantages of the present invention will become apparent from the following description in connection with the accompanying drawings.

DETAIL DESCRIPTION OF PREFERRED EMBODIMENTS

A description will now be given with reference to attached figures to illustrate many advantages/features of the present invention, according to various illustrative embodiments of the present invention.

Figure 1:
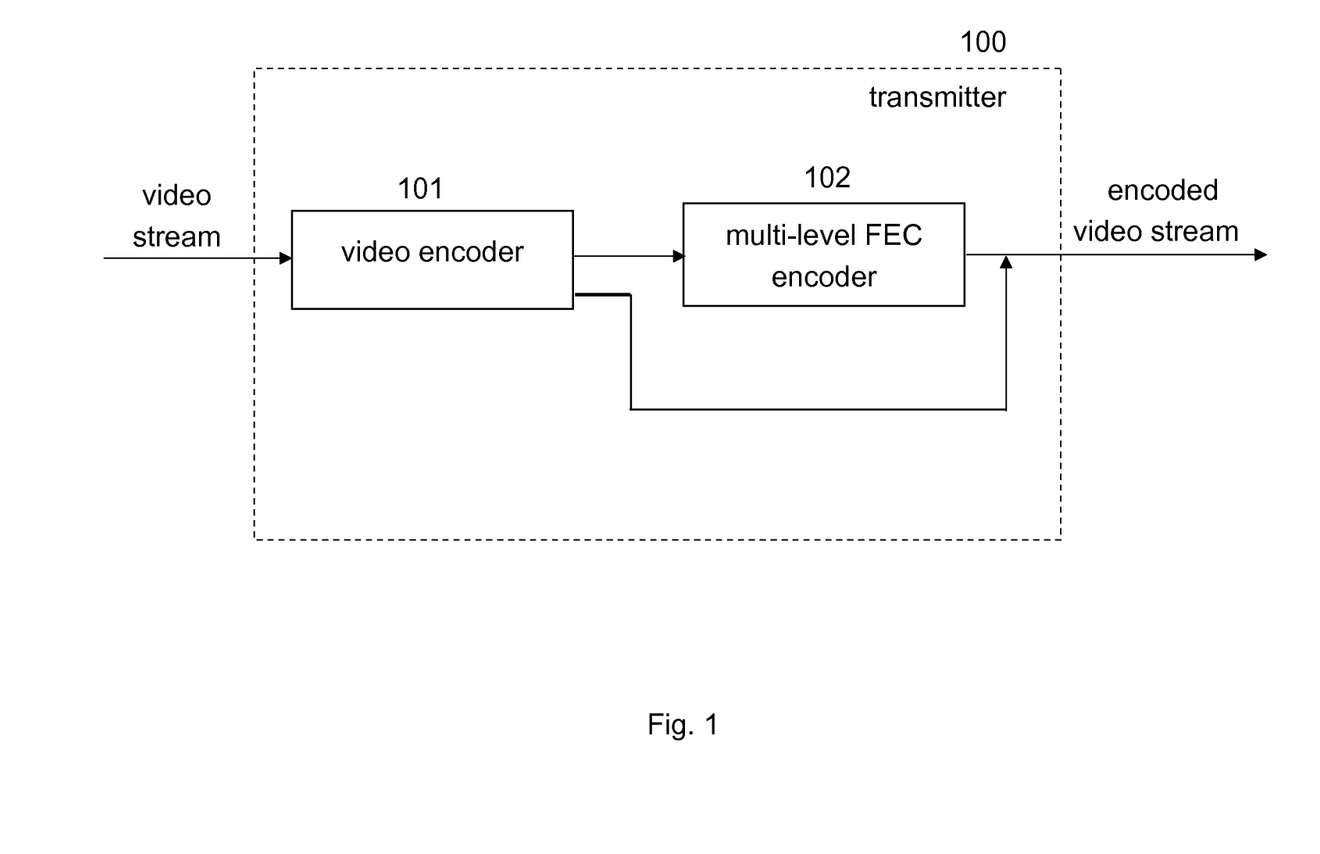
FIG. 1 is a block diagram illustrating an exemplary transmitter in accordance with an embodiment of the present invention.

FIG. 1 is a block diagram illustrating an exemplary transmitter 100 in accordance with an embodiment of the present invention. The transmitter 100 is used for encoding the video stream and transmitting the encoded video stream to a video receiver, such as TV receiver; which includes a video encoder 101 and a multi-level FEC encoder 102. The video encoder 101 receives video stream from a video source (not shown) and performs video encoding, such as MPEG video encoding or other video encoding technology in the prior art, so as to compress the video stream for transmitting. The multi-level FEC encoder 102 performs FEC coding for the coded video stream output from the video encoder 101 to form FEC packets. The coded video stream along with the FEC packets are output to the outside network, such as the video broadcasting network or the IP network and so on. It is known that the coded video stream can be transmitted in a plurality of channels, and each channel can transmit different video stream, such as TV program.

Figure 2:
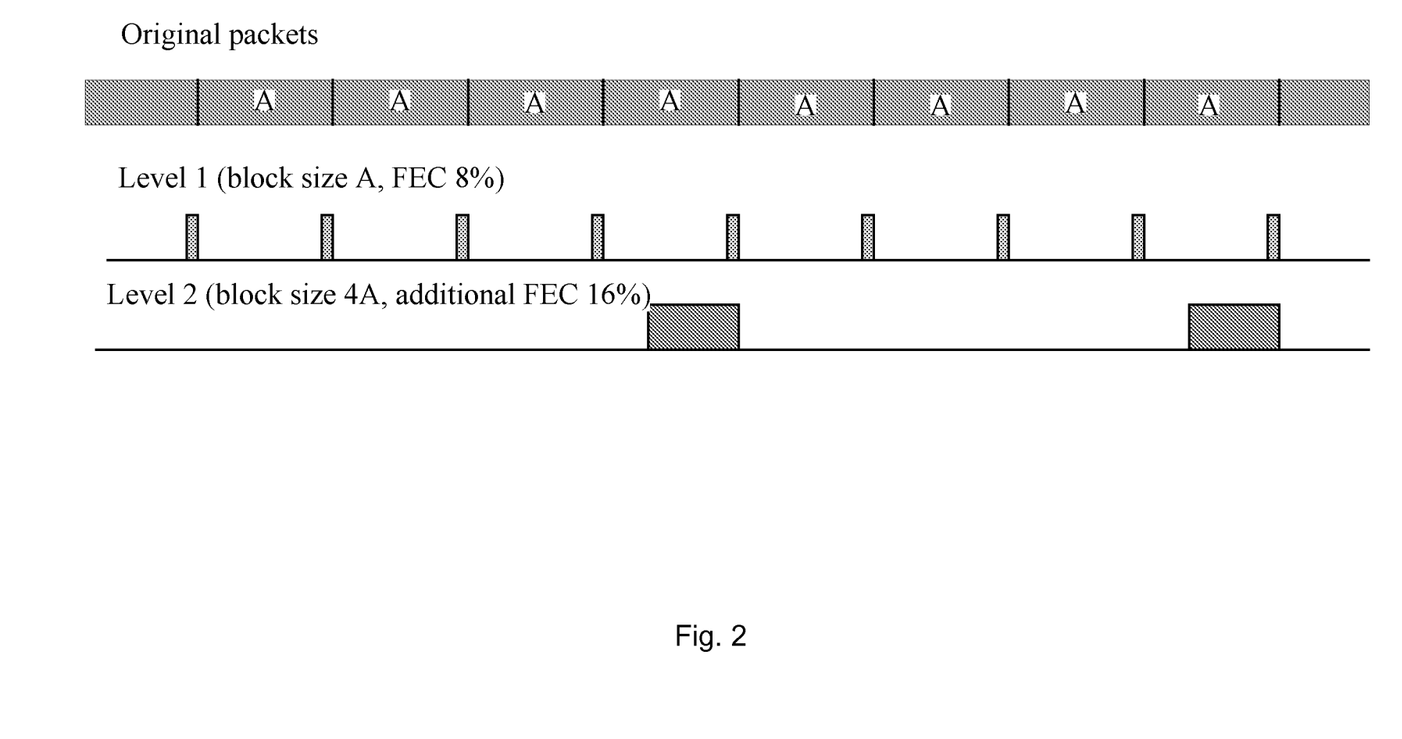
FIG. 2 is a figure for illustrating a two level FEC encoding in the transmitter.

In FEC encoder 102, the encoded video stream is configured to include a plurality of levels of data block with different block sizes. The level is configured to perform the FEC encoding block by block in the FEC encoder 102, and the encoded video stream is not changed. An exemplary description is provided herein to illustrate the FEC coding process for a two level video stream. FIG. 2 is a figure for illustrating the two-level FEC encoding in the transmitter 100. In FIG. 2, two levels are used to perform the FEC coding process, level 1 and level 2. In level 1, the video packets are configured to include video blocks with a block size of A, one video packet. In level 2, the video packets are configured to include video blocks with a block size of 4A, four video packets. That is, each one video packet of the data stream, a data block with a block size A, is performed FEC encoding to get FEC data in level 1, and simultaneously each four video packets of the data stream, a data block with a block size 4A, is performed FEC encoding to get FEC data in level 2. It is known that each block includes a plurality of video packets, and the number of video packets in each block can be selected by one skilled in the art as required.

Then, FEC coding is used for each block of the two levels. The error correcting function chosen in this embodiment is XOR which has the ability to recover any one of the lost packet with one FEC packet. Many methods can be used to generate FEC packets, and the detailed description is omitted herein. In this embodiment, we encode 8% of FEC packets as the redundancy to each block in level 1, and 16% of FEC packets as the redundancy to each block in level 2.

After the FEC coding, the FEC data packets are transmitted to outside network along with the video stream including video packets blocks. It shall be noted that, in this embodiment of the invention, level 1 has a smaller block size, which can be used to decode the video stream firstly at the video receiver, when starting to receive video stream of a channel at the video receiver, for example when starting up the video receiver or changing from one channel to another new channel. Thus some packet losses in the video block may be recovered quickly, and the video receiver can also play back the video stream quickly, such as during 2-3 seconds.

In addition, level 2 has a larger block size so that more packet losses in the video block may be recovered completely so that the video stream with a high quality can be played back in the receiver when starting to receive video stream of a channel at the video receiver or during the time of playing back.

Figure 3:
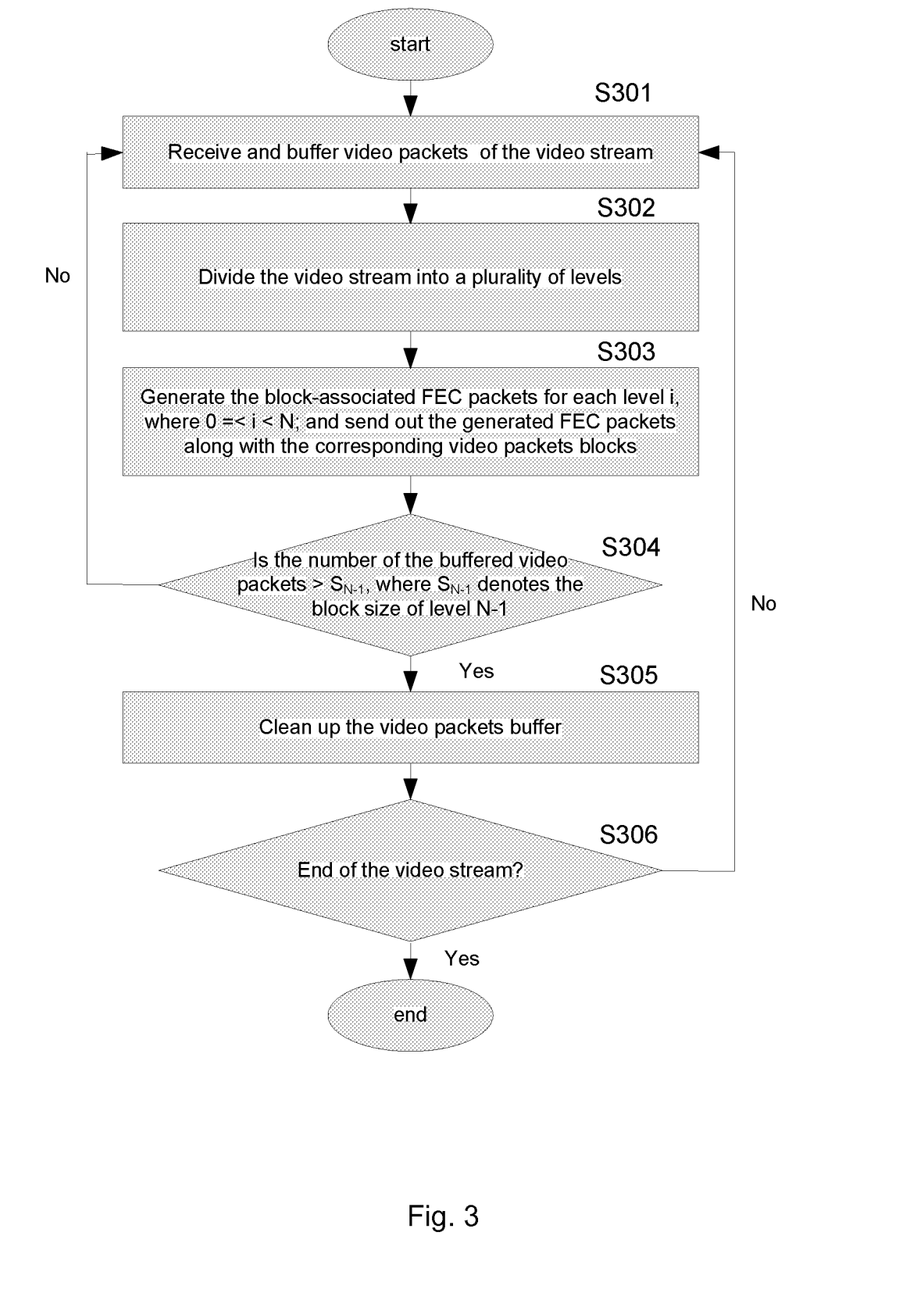
FIG. 3 is a flow chart depicting a method for generating the multi-level FEC packets in the transmitter.

FIG. 3 is a flow chart depicting a method for generating the multi-level FEC packets in the transmitter. At step 301, the video packets of the video stream are received from the video source and buffered. Such video packets have been coded by the video encoder. Then, at step 302, the video stream is configured to include a plurality of levels of data blocks with different block sizes, and at step 303, the block-associated FEC packets for each level i are generated, where $1<=i<N+1$, N is the number of level. In this embodiment, two level FEC packets are used, so N=2, and i=1, 2. That is, FEC packets for level 1 and 2 are generated in this step. Here, the block-associated FEC packets mean FEC packets for each block of each level. The FEC packets are send out along with the corresponding video packets blocks to the outside network.

At step 304, it is determined whether the number of the buffed video packets is beyond $S_N$, where $S_N$ denotes the block size of level N, in this embodiment, $S_1=A$, $S_2=4A$. When the result is No, the process will return to step 301 to receive and buffer video packets. When the result is Yes, the process will go forward to step 305. At step 305, the video packets buffer is clean up to receive the coming video packets. Then, at step 306, it is determined whether the video stream is end. When the result is No, the process will return to step 301 to receive and buffer video packets.

Figure 4:
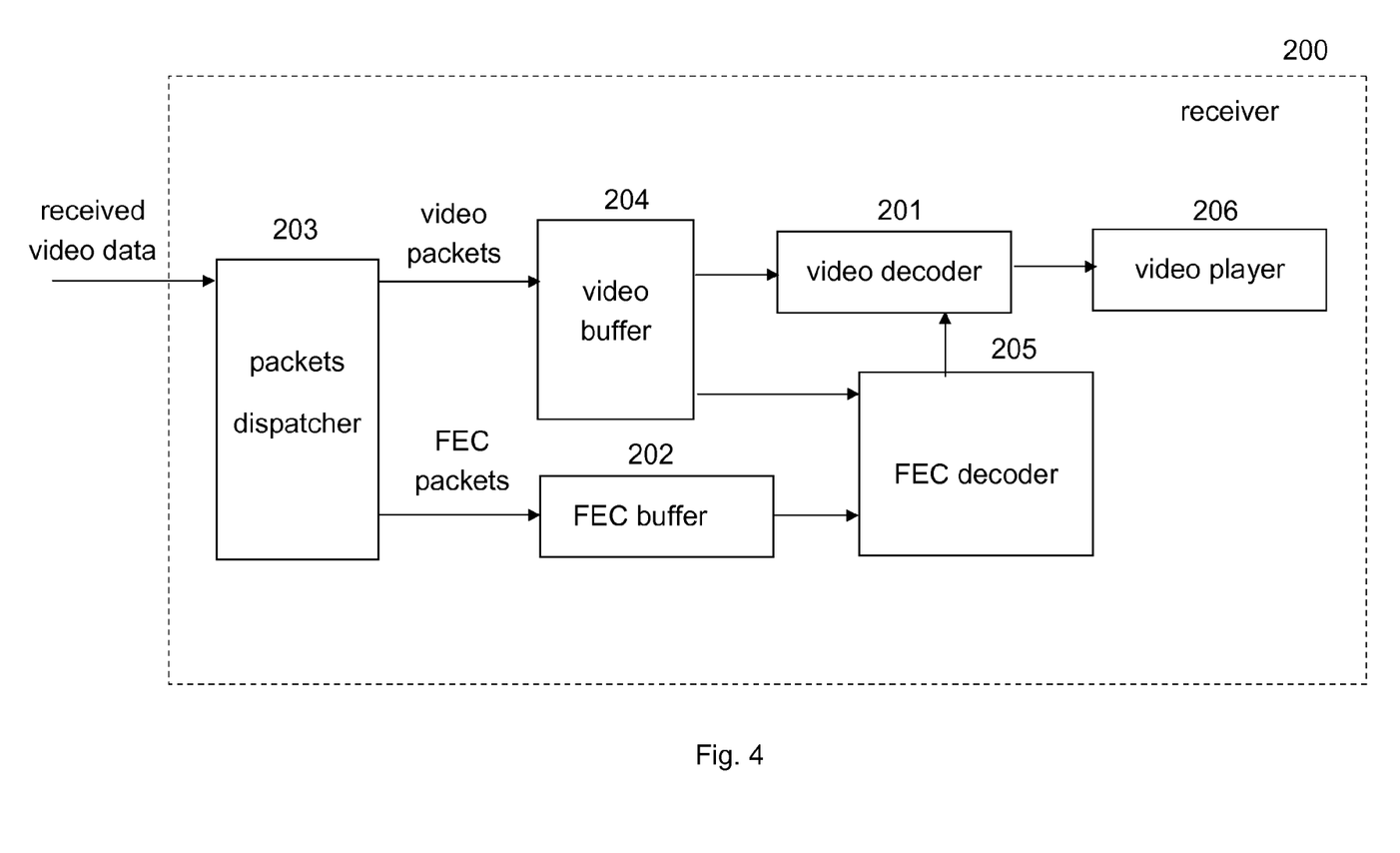
FIG. 4 is block diagram illustrating an exemplary receiver in accordance with an embodiment of the present invention.

FIG. 4 is block diagram illustrating an exemplary receiver 200 in accordance with an embodiment of the present invention. The receiver 200 includes a video decoder 201, a FEC decoder 205, a video buffer 204, a FEC buffer 202, a packets dispatcher 203 and a video player 206.

The packets dispatcher 203 separates the received video data from the outside network into video packets and FEC packets. The received video stream can be selected by a tuner (not shown), so that user can play back different video stream from different channel, such as various TV program in the channels. It is known to one skilled in the art that the tuner and the above selection are not necessary in the invention. Alternatively, the video stream from one channel can be received in the receiver 200.

The FEC buffer 202 stores the FEC data packets for decoding by the FEC decoder 205 to recover the packet loss. The video buffer 204 stores the video packets and the recovered video data for decoding by the video decoder 201. The decoded video data is output to the video player 206 for playing back. The decoding process in the video decoder 201 is known in the art, and its detailed description is omitted herein. The process in the FEC buffer 202 and the FEC decoder 205 will be described in detail as follow.

The FEC buffer 202 starts to accumulate the FEC packets of a channel when starting to play the video stream or the FEC packets of a channel. The channel shall be a channel when starting up the receiver, or a new channel when changing from a channel into a new channel. If video packets losses are detected, the FEC decoder 205 starts to decode and recover the missing video packets by using the combination of the received video packets in the same block and the block-associated FEC packets for each level, and then the recovered video packets are provided to the video decoder 201 for decoding the video stream. As described above for the video decoding in the receiver, the number of enough video packets needed for decoding the block at level 1 is A, and the number of enough video packets needed for decoding the block at level 2 is 4A. Therefore, the time delay for decoding the block at level 1 is shorter than that of level 2, and the level 1 is used to decode the video stream firstly, and then the level 2 is used to decode the video stream completely. Thus, the time delay is decreased by using the level 1, and the quality of the decoding can be insured by using the level 2.

Alternatively, if there are more than two levels, the level with the least block size shall be used firstly, and then another level with more block size is used, lastly, the level with the most block size is used to realize the required performance.

Figure 5:
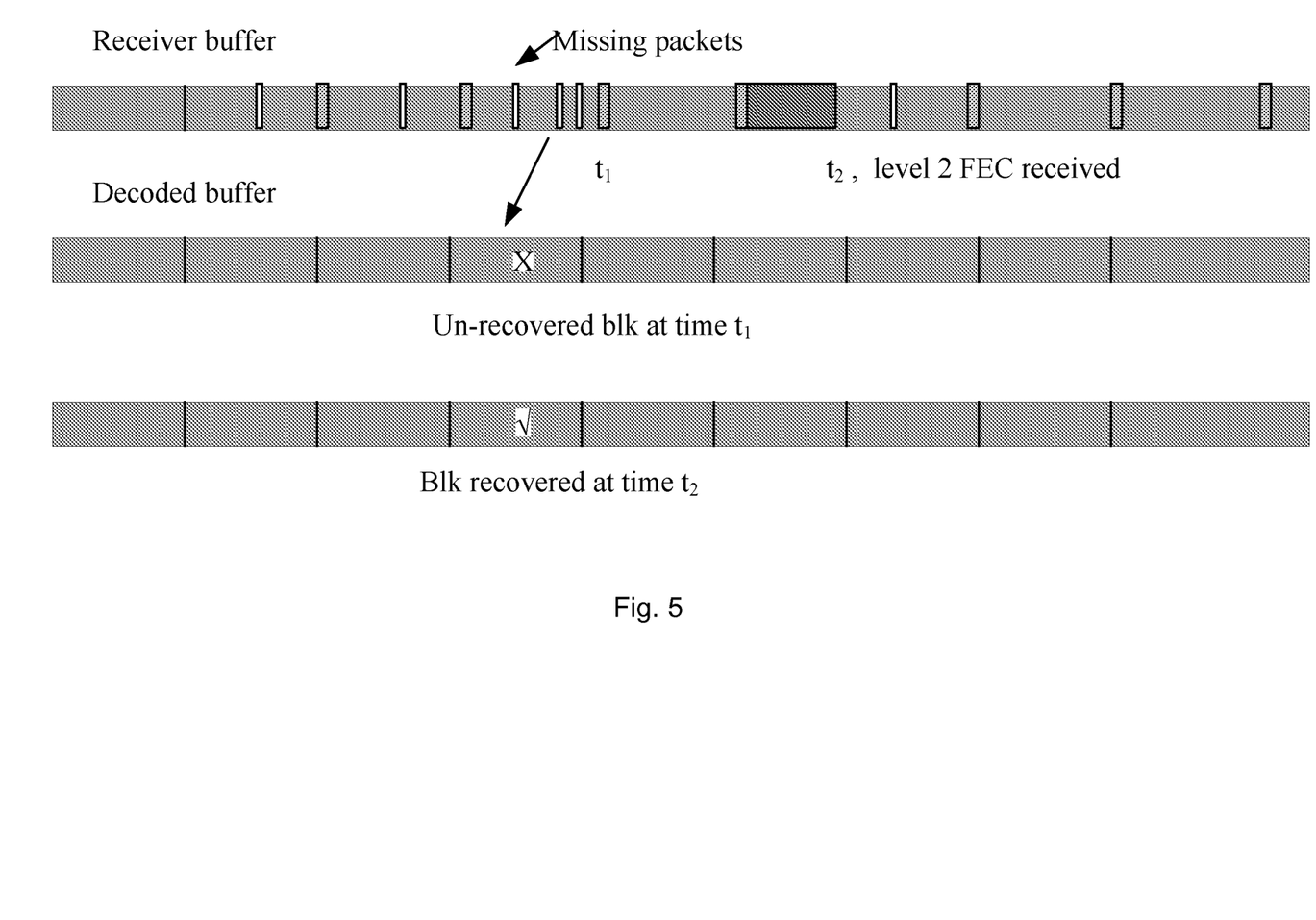
FIG. 5 is a figure for illustrating a two level FEC decoding in the receiver.

FIG. 5 is a figure for illustrating a two-level FEC decoding in the receiver 200. In FIG. 5, some missing packets in the video buffer 204 are shown. If the lost packets can be recovered by level 1 of FEC, the recovered block has about one block (A packets) delay at level 1 (at t1), otherwise, the block can be recovered by the level 2 of FEC, when there are about one block (4A packets) delay at level 2 (at t2) in this embodiment.

In FIG. 4, the video player 206 will read decoded video stream from the video decoder 201 to playback the video stream. After a video packet is read by the video player 206, it will be removed from the buffer immediately. In order to accumulate the enough packets for the decoding of level 2, a play-out rate which is lower than real time rate is used to playback the video until the buffer accumulates enough numbers of packets of the block size at level 2. If buffered packets are played back at normal (real-time) speed, there will be no enough blocks for level 2 FEC decoding to be accumulated.

In this embodiment, the buffer occupancy keeps increasing as long as the playback rate is lower than the real-time rate. The minimum buffering is one block at level 1 (A packets), the FEC packets at level 1 can recover certain amount of errors. The buffer occupancy increases until one block at level 2 (4A packets), then the blocks recovered by FEC packets at the level 2 can be used before it is dropped.

It shall be noted that the real time rate shall be resumed to play back the video stream after the buffer is filled to the size required (4A) for a given level (level 2). The time period (T) for lower speed playback is depending on 1) the difference between the slow rate and the normal rate (delta_R), 2) the buffer requirement difference between two levels (delta_B). T=delta_B/delta_R Given a target delay for the level 2 FEC taking into effect T1 from the time of channel change, we can find the slow rate R0 to be used for data accumulation. The method is as following:

1. Given the normal playback rate R, block size for level 1 is A and level 2 is 4A.
2. Channel switch time T0=A/R.
3. Buffer accummulation to 4A requires T1−T0=delta_B/(R−R0)
4. Therefore the slow rate is R0=R−delta_B/(T1−T0).

After the time period T, the two-level FEC encoding can be used to obtain a better quality. Alternatively, only level 2 is used, which can obtain a good quality and reduce the complicacy of the FEC coding.

Figure 6:
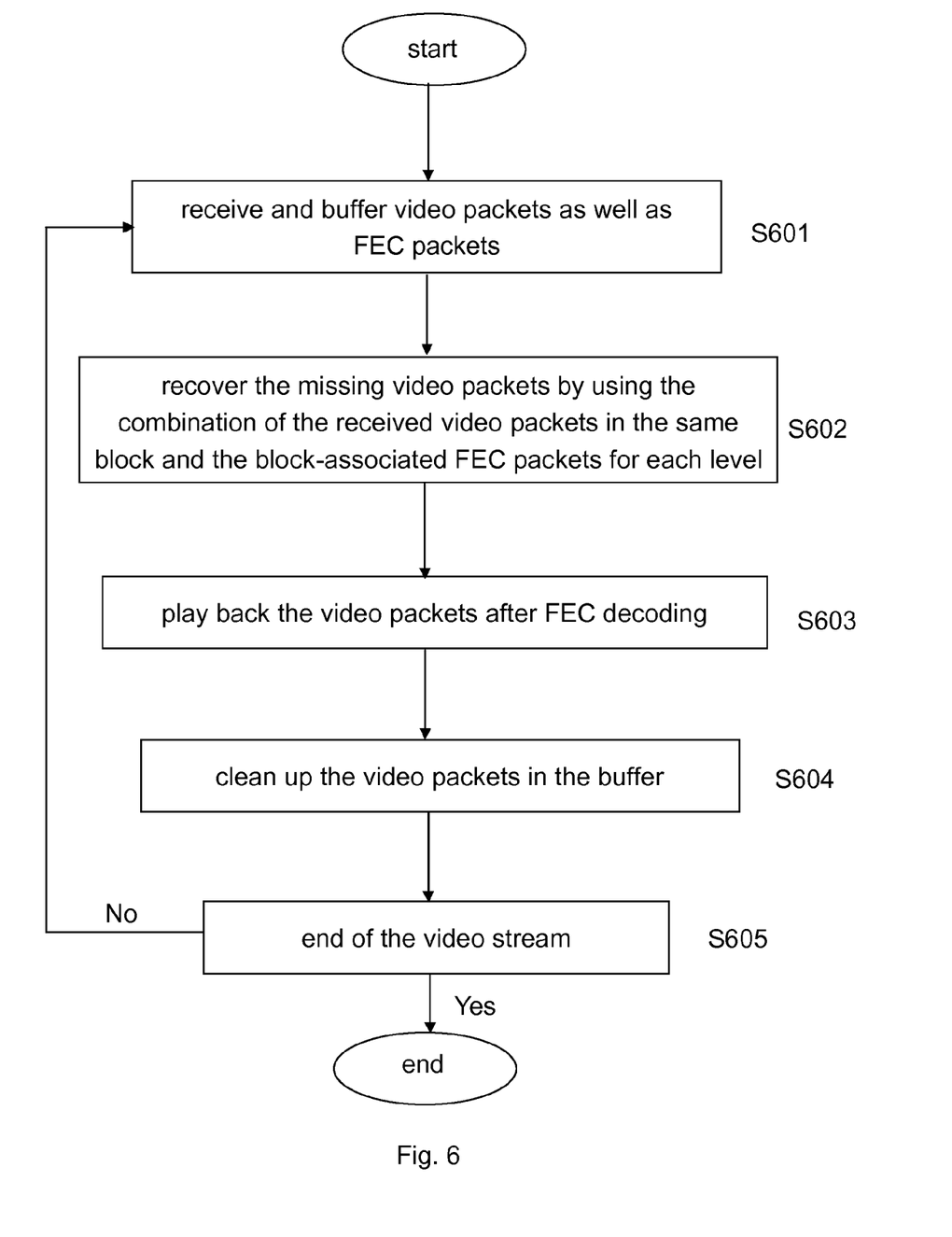
FIG. 6 is a flow chart depicting a method for multi-level packets correction in the receiver.

FIG. 6 is a flow chart depicting a method for multi-level packets correction in the receiver. At step 601, the video packets are received from the outside network and buffered in the receiver 200. Then, at step 602, the video packet buffer is consumed by FEC decoder and the missing packets are recovered if any.

At step 603, the video packets after FEC decoding are played back at the player 206. At step 604, the video packets buffer is filled with the next block incoming video packets. Then, at step 605, it is determined whether the video stream is end. When the result is No, the process will return to step 601 to receive and buffer video packets.

Instead of only using predetermined multi-level FEC for channel coding as described above, we may have dynamic multi-level FEC method thanks to applying the request for retransmission (ARQ) mechanism. For example, if the channel quality is good, only level 1 FEC packets are transmitted. If the channel quality becomes worse, the receiver may send ARQ requests to the transmitter. In case that the level 2 FEC packets may be sent out by the transmitter as well for improving the error correction performance at the receiver side.

As described above, with the method and devices in the embodiment of the invention, once a user switches a TV program channel, the new TV program can be seen with a short delay corresponding to first level of FEC, however the packet loss may not be all recovered for a while if channel condition is not good enough, so the video quality may suffer at the same time with some micro blocks or drop frames, but as the time goes on, the video quality can be increased after a period of time when second level FEC takes effect, e.g. ~10 seconds. The adaptive packet loss recovery approach resolves the trade-off between FEC block size and channel switching time.

Although the specific process based on the principle of the present invention is described above, it cannot be considered to be a limit to the present invention. For example, as described above, the TV transmitter and receiver are used to illustrate the embodiments of the invention. However, it is apparent to one skilled in the art that other video transmission and playback system can also be used, and even other data transmission and receiving system can be used. Therefore, the invention can be used in any encoding and decoding system with the FEC encoding, to resolve the problem that the receiving time delay is too long, so that the data stream can be decoded quickly, and the decoded data stream has a required quality.

The foregoing merely illustrates the principles of the invention and it will thus be appreciated that those skilled in the art will be able to devise numerous alternative arrangements which, although not explicitly described herein, embody the principles of the invention and are within its spirit and scope. It is to be understood that numerous modifications may be made to the illustrative embodiments and that other arrangements may be devised without departing from the spirit and scope of the present invention as defined by the appended claims.

The invention claimed is:

1. A method for Forward Error Correction FEC encoding in a transmitter, the method comprising:
   receiving a data stream including data packets from a data source;
   encoding the data stream to generate data packets;
   generating first Forward Error Correction data by using a data block with a first block size to perform Forward Error Correction encoding on the data packets; and
   generating second Forward Error Correction data using a data block with a second block size to perform Forward Error Correction encoding on the same data packets, wherein the second block size is different than the first block size, and wherein the FEC encoding method is dynamic, with a satisfaction level of a channel quality being employed to determine whether or not to transmit all FEC data packet levels.

2. The method according to claim 1, further comprising transmitting the first FEC data and the second FEC data along with the data packets in the data stream to a receiver via a plurality of channels.

3. The method according to claim 2, wherein the first block size is less than the second block size, so that the first FEC data is selected among the first FEC data and the second FEC data to be used to decode the data packets firstly when starting to receive the data stream of a channel at the receiver, wherein, both the first FEC data and the second FEC data are able to decode any one of the data packets.

4. The method according to claim 3, wherein the second FEC data is selected among the first FEC data and the second FEC data to be used to replace the FEC data of the data blocks of the first block size to decode the data stream during the time of playing back.

5. A transmitter for implementing the FEC encoding method according to claim 1.

6. A method for dynamic Forward Error Correction FEC decoding in a receiver, the method comprising:

receiving FEC data including a first FEC data and a second FEC data along with data packets of a data stream from a transmitter, wherein the first FEC data and the second FEC data are generated by separately using a data block with a first block size and a data block with a second block size to perform Forward Error Correction encoding on the same data packets of the data stream, and wherein the second block size is different than the first block size;

sending a request for retransmission to the transmitter to request transmission of a next level of FEC packets when a channel quality is determined to be unsatisfactory; and decoding the data packets by using the first FEC data and the second FEC data.

7. The method according to claim 6, wherein the first FEC data and the second FEC data along with the data stream are received via a plurality of channels.

8. The method according to claim 7, wherein the first block size is less than the second block size, and the step of decoding comprises decoding data packets firstly by using the first FEC data when starting to receive the data stream of a channel, wherein, the first FEC data is selected among the first FEC data and the second FEC data, and both the first FEC data and the second FEC data are able to decode any one of the data packets.

9. The method according to claim 8, wherein the step of decoding comprises decoding data packets included in the data block with the second block size by using the second FEC data that replaces the first FEC data during the time of playing back.

10. The method according to claim 9, wherein the data stream is a video stream, and the method further comprises playing the data stream decoded by the FEC data with a video player.

11. The method according to claim 10, wherein the step of playing comprises playing the video stream decoded by the first FEC data by a playback rate less than a normal rate firstly until an amount of data packets equivalent to the second block size playing the video stream decoded by the second FEC data at a normal rate.

12. A receiver for implementing the FEC decoding method according to claim 6.

\* \* \* \* \*